United States Patent [19]
Christiansen et al.

[11] Patent Number: 6,075,855
[45] Date of Patent: Jun. 13, 2000

[54] METHOD OF ACCESSING A SCP IN AN ISUP NETWORK WITH PARTIAL RELEASE

[75] Inventors: Axel Christiansen, Glendale; Marvin Gene Distel, Phoenix, both of Ariz.

[73] Assignee: AG Communication Systems Corporation, Phoenix, Ariz.

[21] Appl. No.: 09/020,351

[22] Filed: Feb. 9, 1998

[51] Int. Cl.[7] .................................................. H04M 7/00
[52] U.S. Cl. ...................... 379/221; 379/201; 455/445; 455/433
[58] Field of Search .................................. 379/201, 207, 379/221, 211; 455/445, 433

[56] References Cited

U.S. PATENT DOCUMENTS

| | | | |
|---|---|---|---|
| 5,377,186 | 12/1994 | Wegner et al. | 379/201 X |
| 5,974,309 | 10/1999 | Foti | 455/41 C |
| 5,995,843 | 11/1999 | Sjödin et al. | 455/445 X |
| 6,023,618 | 2/2000 | Sanhonen et al. | 455/456 X |

*Primary Examiner*—Creighton Smith
*Attorney, Agent, or Firm*—David J. Zwick

[57] ABSTRACT

A SCP connected to a switch through an ISUP loop-back trunk redirects a dialed call to an intermediate destination. After the intermediate destination releases the call, all circuit segments from the intermediate destination back through and including the inbound (to the MSC) side of the loop-back trunk are cleared. The SCP then establishes a connection through the inbound leg of the loop-back trunk to the dialed destination. The SCP remains in the circuit for the duration, including all intermediate call completions as well as the call to the dialed destination. When the call to the dialed destination is complete, the entire connection is released per standard ISUP procedures.

4 Claims, 4 Drawing Sheets

METHOD OF ACCESSING A SCP IN AN ISUP NETWORK WITH PARTIAL RELEASE

FIELD OF THE INVENTION

The present invention relates to telecommunications networks, and more particularly to call set-up and clearing for an intermediate access to a SCP in an ISUP network.

BACKGROUND OF THE INVENTION

Delivery of enhanced services in cellular telecommunications systems has become commonplace and serves to differentiate cellular providers in the marketplace. These enhanced services include 800 Services, Geographic Call Routing, Flexible Call Routing, Flexible Carrier Selection, CLASS Services, and Single Number Service. These services are typically of the number translation type, which involves accessing a database through a Service Control Point (SCP) and retrieving call processing information that is used to forward a call to the desired final destination.

Most cellular systems now support the Signalling System 7 (SS7) Integrated Services Digital Network User Part (ISUP) call control protocol, as described in American National Standards Institute (ANSI) standard T1.113-1995, "Signalling System Number 7 (SS7)—Integrated Services Digital Network (ISDN) User Part," 1995, New York, N.Y., hereby incorporated by reference.

One system for delivering enhanced services in an ISUP network is described in U.S. Pat. No. 5,377,186 to Wegner, et al. The system uses a Local Switch (LS) connected through the network to a SCP wherein a subscriber services database resides. The LS is provisioned for ISUP. A number of loop-back trunks with defined Circuit Identification Code (CIC) pairs are also provisioned on the LS. The routing table in the LS is modified to route the voice signal for calls requesting the enhanced subscriber service to the outbound connection of one of the loop-back trunks, and to route to the SCP the associated ISUP messages. The SCP is modified so that an ISUP interface will perform limited switch-type functions, e.g., number translation, using parameters in the ISUP call-setup messages that were originally intended for conditions such as call forwarding. To the network, the SCP appears to be a switch.

When a call requesting the enhanced user service is received by the LS, an ISUP Initial Address Message (IAM) is routed to the SCP and voice is directed to the CIC of the outbound connection of a loop-back trunk. When the SCP receives the IAM message, the ISUP interface treats the IAM message as a query message requesting retrieval of a subscriber service. The SCP responds to the query and returns a new routing number, or translated destination, for the call. The ISUP interface generates an IAM(Call-Forward) message that includes the new routing number and the CIC of the inbound connection of the loop-back trunk. The IAM(Call-Forward) message is then sent back to the originating LS directing the LS to initiate a new call to the translated destination. Thus the original call is connected to the translated destination via the loop-back trunk, which remains in the circuit for the duration of the call. As well, the SCP remains in the signaling path of the call and appears to control a voice circuit segment that connects the outbound portion of the loop-back trunk to the inbound portion of the loop-back trunk. The concepts in the invention described in the patent to Wegner, et al., may generally be applied to cellular radio telecommunication systems by incorporating the suggested changes to the LS into a Mobile Switching Center (MSC) of a cellular system in an SS7/ISUP network.

The approach described by Wegner, et al., works well for enhanced services of the number translation type that require a single hop??? to a SCP before connection to the final destination. However, there are enhanced services in an ISUP network that require a connection to an intermediate end-point destination followed by a connection to a final destination. For example, in the preferred embodiment of the present invention, a caller is first connected via a SCP to an interactive voice response unit (IVRU) residing on a separate network element, in the manner of Wegner, et al., that can, for example, give status of the caller's enhanced services account. After interacting with the IVRU, this connection is dropped and the caller is then connected via the SCP, again in the manner of Wegner, et al., to the final destination. In the embodiment, the SCP stays in the circuit.

In the standard ISUP protocol, this enhanced service would be difficult to implement because ISUP protocol calls for the complete end-to-end tear down of a call upon a release generated anywhere in the connection. It is desirable to release only a portion of the established circuit segments while maintaining the rest, for example, only those segments from the intermediate end destination back to the SCP, and then to extend the maintained segments to a new destination.

Accordingly, it is an object of the present invention to provide a method in an ISUP network that will allow a connection to an intermediate destination followed by a connection to a final destination without complete call tear down upon release of the intermediate circuit, thus allowing a SCP to remain in the circuit for the complete duration of all connections.

SUMMARY OF THE INVENTION

The present invention is a method and system in an ISUP network that will allow a connection to an intermediate destination through a SCP, followed by a release of only those circuit segments from the intermediate destination to the SCP, followed by establishing a new connection from the SCP to a final destination, which is an extension of the remaining segments of the original connection. This allows the SCP to remain in the circuit for the complete duration of all connections.

The invention utilizes the ISUP loop-back trunk technique, as described in Wegner, et al., to first connect the calling party via a SCP to, for example, an IVRU. After the caller interaction with the IVRU is complete, the serving CO issues a Release (REL) message when the IVRU disconnects from the call. The IVRU disconnect and subsequent REL message results in the release of all circuit segments from the IVRU back to and including the inbound (to the MSC) side of the loop-back trunk. The circuit segments from the calling party through the outbound leg of the loop-back trunk, including the associated ISUP signaling path between the MSC and the SCP are maintained. The SCP then generates a new IAM message requesting a connection through the inbound leg of the loop-back trunk to the final call destination.

In this manner, the SCP remains in the circuit for the duration, including all intermediate call completions as well as the call to the final destination. When the call to the final destination is complete, the entire connection is released per standard ISUP procedures.

DESCRIPTION OF THE PREFERRED EMBODIMENT

Figure 1:
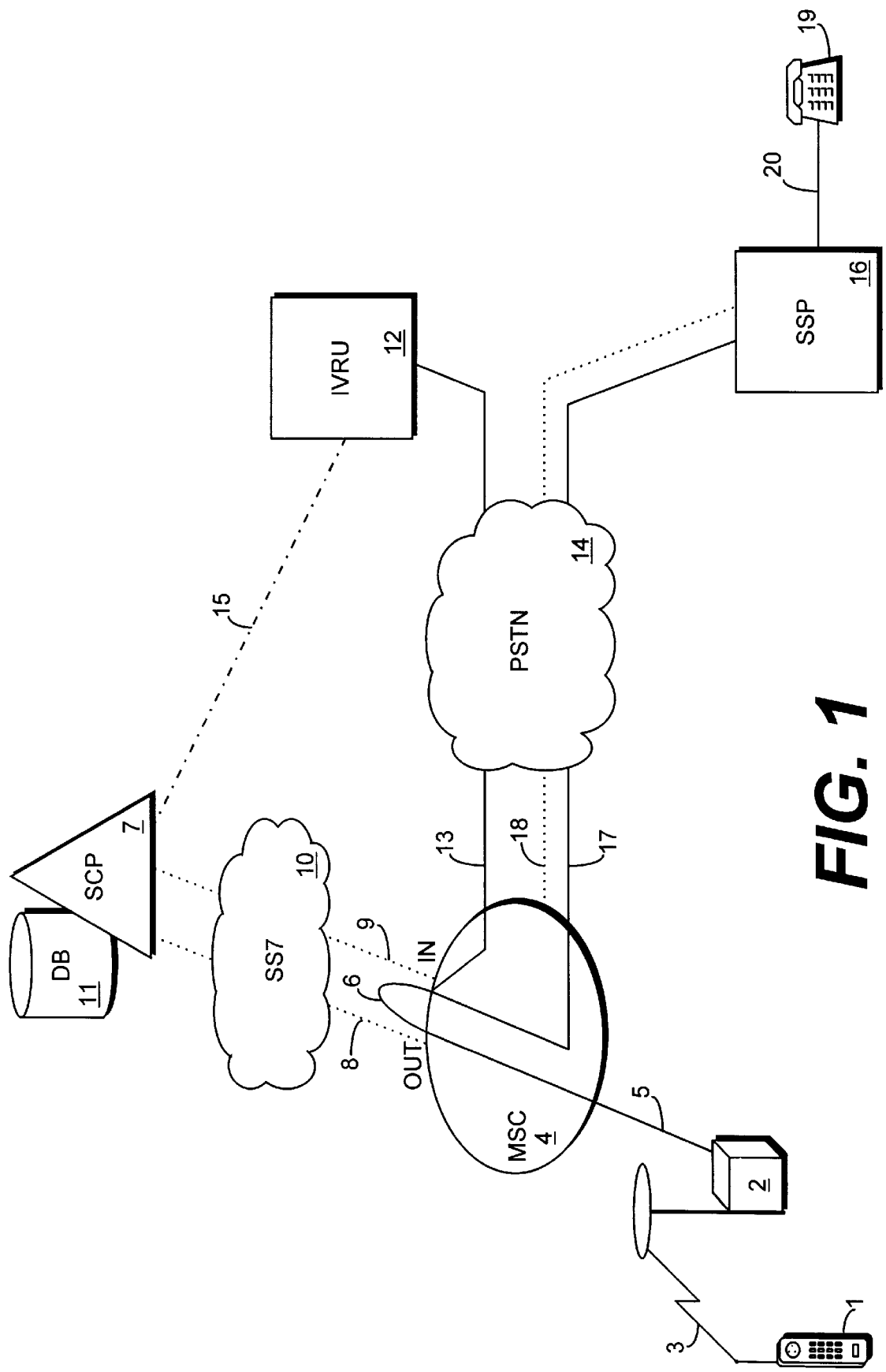
FIG. 1 shows a block diagram of the system of the preferred embodiment for accessing a SCP in an ISUP network with partial call release.

FIG. 1 shows a block diagram of the system of the preferred embodiment for accessing a SCP in an SS7/ISUP network with partial call release. In the preferred embodiment, the inventive concepts of the present invention are applied in the context of a wireless prepaid enhanced service, as further described below.

Cellular calling party 1 is connected to cell tower 2 over radio-telecommunications link 3. Cell tower 2 is connected to mobile switching center (MSC) 4 over multi-frequency (MF) trunk 5. MSC 4 generally includes a plurality of loop-back trunks, one of which is shown at 6. Loop-back trunk 6 has an outbound side and an inbound side with respect to MSC 4. Loop-back trunk 6 is allocated to SCP 7. SCP 7 can be a suitable model of any of the commercially available SCPs. In practice, several loop-back trunks may be allocated to a SCP. Outbound ISUP signaling trunk 8 and inbound ISUP signaling trunk 9 connect MSC 4 and SCP 7 through SS7 network 10. These signaling trunks are associated with the outbound side and inbound side of loop-back trunk 6, respectively. SCP 7 includes enhanced services database 11.

MSC 4 is also connected to Interactive Voice Response Unit (IVRU) 12 over MF connection 13 through public switched telephone network (PSTN) 14. IVRU 12 can be a suitable model of any of the commercially available IVRUs. IVRU 12 is also connected to SCP 7 over TCP/IP link 15. MSC 4 is further connected to SSP 16 over voice trunk 17 and ISUP signaling trunk 18 through PSTN 14. PSTN 14 preferably includes SS7/ISUP signaling. SSP 16 is further connected to called party 19 over twisted pair connection 20. Although not explicitly shown, ISUP trunks 8, 9 and 18 and voice trunks 5, 13 and 17 may include network elements such as service switching points (SSP), tandem switches and signal transfer points (STP).

In the preferred embodiment of the invention, SCP 7 is modified to appear as a switch to other network elements of the SS7/ISUP network. ISUP is typically used as a call control protocol between switches that share voice trunk connections. Since SCP 7 is not a true switch and has no voice trunks, voice trunks are simulated by way of loopback trunks on other switches. On MSC 4, loop-back trunk 6 is configured by hard-wiring an outbound voice trunk to an inbound voice trunk, and routing the SS7 ISUP data messages associated with the outbound voice trunk to the SCP. In addition, ISUP signaling trunk 8 associated with the outbound voice trunk of loop-back trunk 6 and ISUP signaling trunk 9 associated with the inbound voice trunk of loop-back trunk 6 are both connected to SCP 7. Preferably, both ends of loop-back trunk 6 have the same circuit identification code (CIC), while a first signaling point code (SPC) is assigned to the SCP connection of outbound ISUP link 8, and a second SPC is assigned to the SCP connection of inbound ISUP link 9. To MSC 4, loop-back trunk 6 appears as two independent trunks, each having a unique identification at the switch. In operation, MSC 4 controls outbound calls to SCP 7 on the outbound trunk of loop-back trunk 6, and SCP 7 controls inbound calls to MSC 4 on the inbound trunk of loop-back trunk 6.

A typically executed procedure for a basic phone call in an ISUP network, per T1.113, is described below. For purposes of illustration, a local switch and destination exchange separated by a single intermediate exchange is assumed. In general, there may be many intermediate exchanges. For simplicity, some related details are omitted, such as those related to timers, alerting, and message parameters.

After the calling party has dialed, the local switch reserves an outgoing voice trunk to the intermediate exchange based on a routing table entry associated with the dialed number. The local switch then sends an Initial Address Message (IAM) over a signaling trunk to the intermediate exchange requesting a connection be established over the reserved voice trunk.

The intermediate exchange then reserves an outgoing voice trunk to the destination exchange based on a routing table entry associated with the dialed number in the IAM received from the local exchange. The intermediate exchange then sends an IAM over a signaling trunk to the destination exchange requesting a connection be established over this reserved voice trunk.

Upon receipt of this IAM message, the destination exchange acknowledges receipt of the IAM by sending an ACM back to the intermediate exchange indicating that the destination exchange has reserved its end of the circuit designated as reserved in the IAM. In response to this ACM, the intermediate exchange sends an ACM to the local exchange indicating that all exchanges in the call path have reserved circuits for this call.

The destination and local exchanges then apply ringing to the called and calling parties, respectively, on their subscriber lines. When the called party answers the phone, the destination exchange sends an Answer Message (ANM) to the intermediate exchange. When the intermediate exchange receives the ANM, the reserved voice circuit between the intermediate exchange and the destination exchange is cut through. The intermediate exchange then sends an ANM to the local exchange. When the local exchange receives the ANM, the reserved voice circuit between the local exchange and the intermediate exchange is cut through. When all circuits associated with the phone call are cut through, conversation can begin. No other SS7 messages are necessary until one of the parties hangs-up.

When the calling party hangs-up first, the local exchange immediately starts the release of the switched path and, at the same time, sends a Release Message (REL) to the intermediate exchange. On receipt of the REL from the local exchange, the intermediate exchange will immediately start the release of the switched path. When the path has been fully disconnected, a Release Complete Message (RLC) is returned to the local exchange. At the same time, the intermediate exchange sends a REL message to the destination exchange. On receipt of the REL message from the intermediate exchange, the destination exchange immediately starts the release of the switched path. When the path has been fully disconnected, a RLC message is returned to the intermediate exchange.

When the called party hangs-up first, the release procedures are essentially the same, except the direction of the REL and RLC messages are reversed. Generally, when both the calling and called parties, or any two points in the connection, initiate call releases by sending REL messages to adjacent exchanges after release of the switched path has been initiated, the exchanges receiving the REL messages will immediately start the release of the switched path and respond to the REL messages with RLC messages, while at the same time sending REL messages to their other adjacent exchanges after release of these associated switched paths has been initiated.

Each exchange makes the path available for new calls after both a RLC message is received for any previously sent REL message, and a RLC message is sent for any previously received REL message.

As can be seen, the ISUP protocol is designed to efficiently handle end-to-end call set-up and clearing. For call set-up, IAM messages are propagated from the calling party exchange through the network to the called party exchange. For call clearing, REL messages are propagated through the network to all exchanges involved in the call. The presence of a SCP utilizing a loop-back trunk in the call path does not affect the basic call set-up and clearing process.

In the preferred embodiment of the present invention, a first call is established to IVRU 12. This call is then released from IVRU 12 back to SCP 7, where SCP 7 intervenes and interrupts the call clearing process, leaving the circuits established between calling party 1 through the outbound trunk of MSC 4 to SCP 7 intact. SCP 7 then begins a second call set-up process, essentially in mid-network, and establishes a new call to called party 19 that builds upon the already established links of the first call.

Figure 2A:
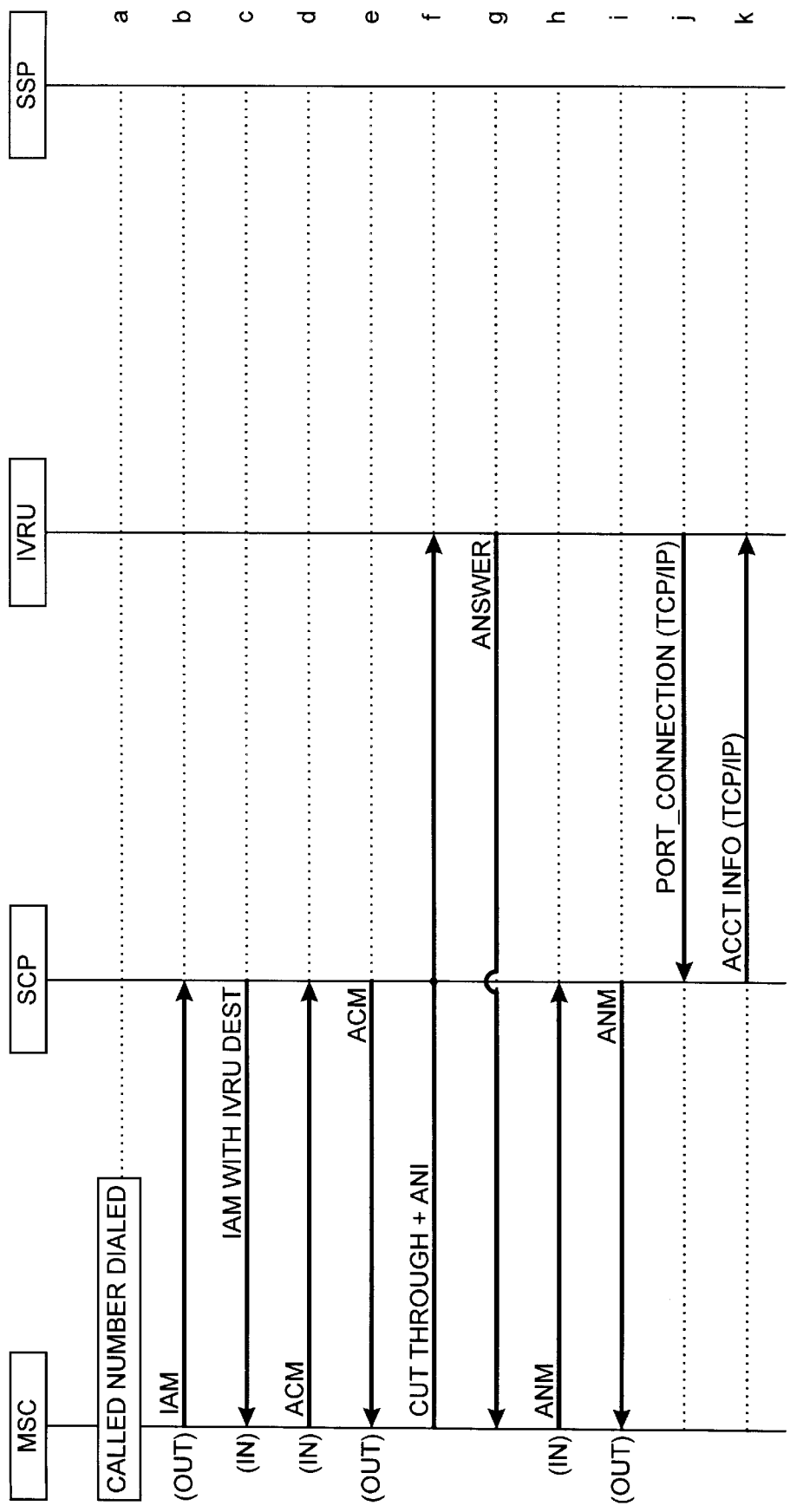
FIG. 2 show a message flow diagram of a representative interaction illustrating the inventive concepts of the preferred embodiment.
Figure 2B:
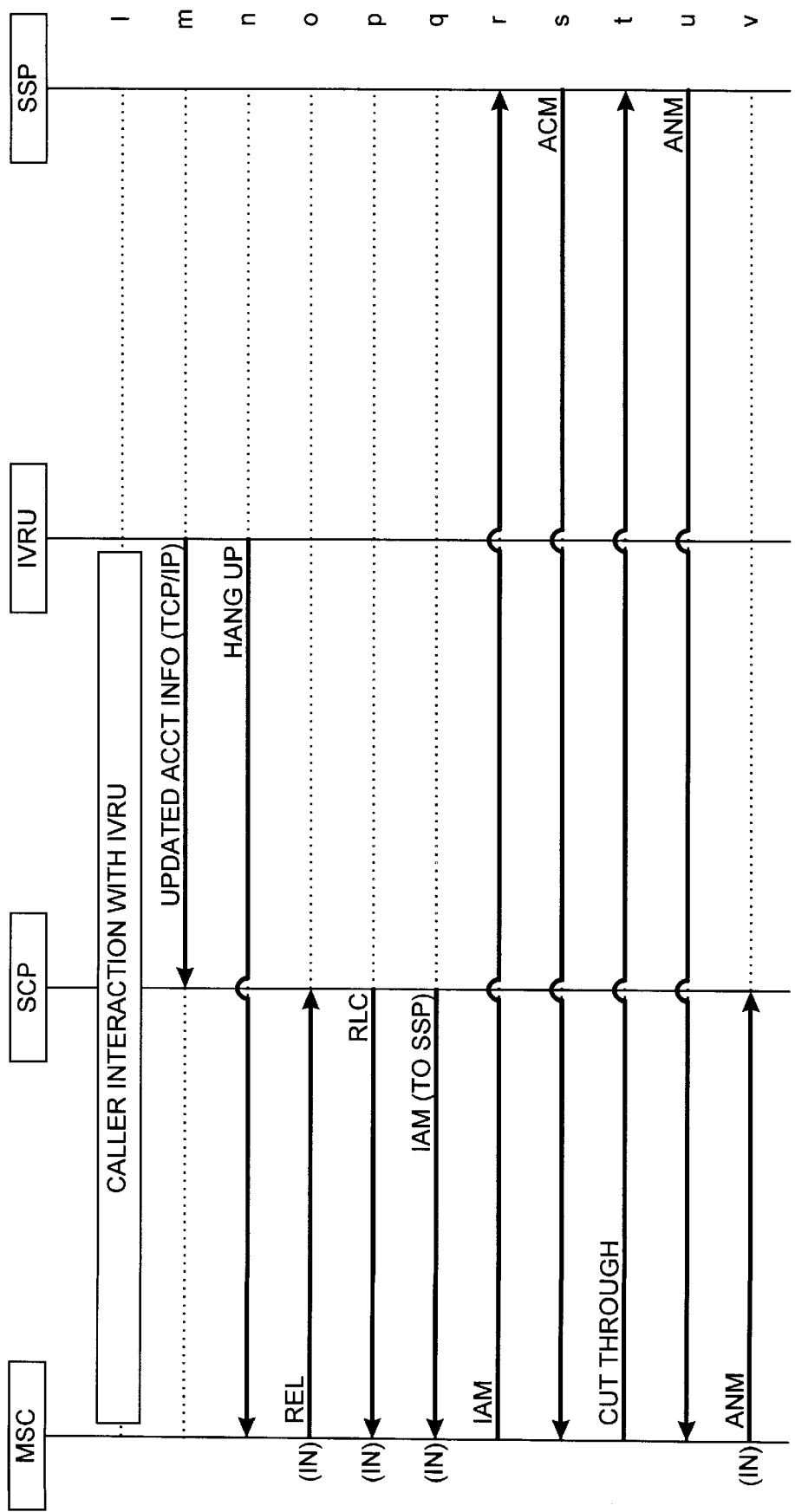
Figure 2C:
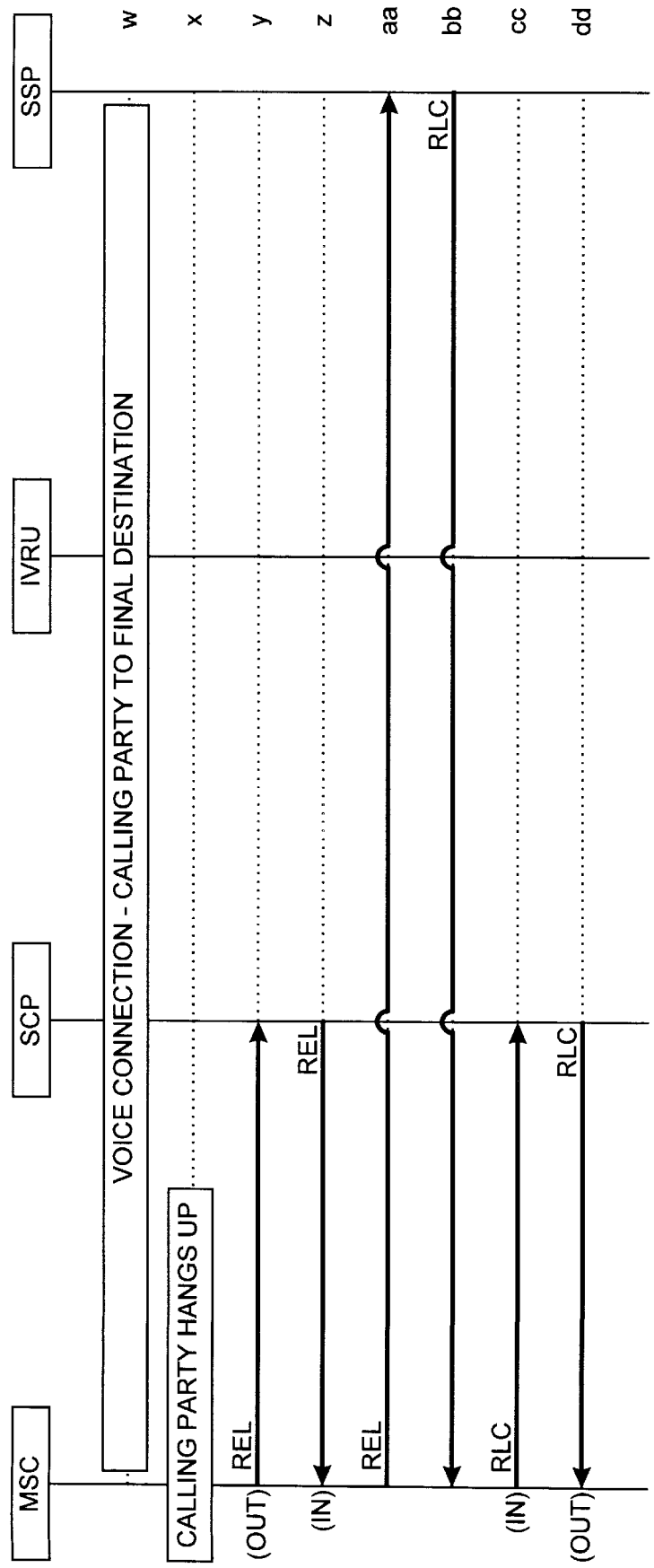

FIG. 2 show a message flow diagram of a representative interaction in the wireless prepaid enhanced service application illustrating the inventive concepts of the preferred embodiment. At a, calling party 1 dials and sends the directory number for called party 19. The dialed number is transmitted to MSC 4 via radio link 3 to cell tower 2 over MF trunk 5.

At b, MSC 4 receives the dialed number and performs an internal translation. MSC 4 is provisioned to route all calls received from wireless prepaid subscribers to the outbound side of ISUP loop-around trunk 6. MSC 4 sends an IAM to SCP 7 on the outbound side of loop-around trunk 6 requesting a voice connection.

SCP 7 receives the IAM from MSC 4 and performs a look-up in database 11 on the calling party's directory number. The wireless prepaid enhanced service application on SCP 7 checks, for example, that the calling subscriber has an account balance sufficiently above a minimum threshold. In this example, the wireless prepaid application determines that the calling party subscriber's account balance is not sufficiently above a minimum threshold and an interaction with IVRU 12 is required.

At c, SCP 7 intervenes and sends an IAM to MSC 4 over the inbound side of loop-around trunk 6 requesting a connection to IVRU 12.

At d, MSC 4 sends an ACM to SCP 7 over the inbound side of loop-around trunk 6 acknowledging receipt of complete address information.

At e, SCP 7 sends an ACM to MSC 4 over the outbound side of loop-around trunk 6 acknowledging receipt of complete address information.

At f, the call between calling subscriber 1 and IVRU 12 is cut through over a path including loop-around trunk 6, and voice trunk 13 over PSTN 14. (ANI stuff???)

At g, IVRU 12 sends Answer back to MSC 4.

At h, MSC 4 sends an ANM to SCP 7 over the inbound side of loop-around trunk 6 indicating the call has been answered.

At i, SCP 7 sends an ANM to MSC 4 over the outbound side of loop-around trunk 6 connecting calling subscriber 1 to IVRU 12.

At j, IVRU 12 sends a TCP/IP PortConnection message to SCP 7 over TCP/IP link 15 connecting the IVRU 12 and SCP 7. The PortConnection message also contains the directory number of calling subscriber 1.

At k, SCP 7 responds to IVRU 12 by sending an Account_Info message containing subscriber account information.

At l, IVRU 12 conducts a voice interaction with subscriber 1. In this example, the balance in the subscriber's account is not sufficient to begin a call, and IVRU 12 conducts a transaction wherein the subscriber replenishes the account.

At m, after the replenishment transaction is complete, IVRU 12 sends a TCP/IP message to SCP 7 over TCP/IP link 15 with the new subscriber account balance information. The wireless prepaid application residing on SCP 7 then updates the subscriber's account record in database 11.

At n, IVRU 12 releases its connection to MSC 4 with a hang up.

At o, MSC 4 sends a REL to SCP 7 over the inbound side of loop-around trunk 6 indicating the call to IVRU 12 has been terminated.

At p, SCP 7 sends a RLC to MSC 4 over the inbound side of loop-around trunk 6 allowing release of the voice segments between IVRU 12 and SCP 7, i.e., IVRU 12 to MSC 4, and MSC 4 to SCP 7 over the inbound side of loop-around trunk 6. (is IVRU to MSC considered a voice segment???)

At q, rather than following the procedure according to the standards of continuing to propagate REL's back to local switch 4 to release all voice segments, SCP 7 intervenes and sends an IAM to MSC 4 over the inbound side of loop-around trunk 6 requesting a voice connection to the original destination dialed by subscriber 1, i.e., called party 19.

At r, in response to the IAM from SCP 7, MSC 4 connects the inbound port of loop-around trunk 6 to voice trunk 17 and sends an IAM to SSP 16 requesting a voice connection over trunk 17.

At s, SSP 16 reserves trunk 17 for the requested call and sends an ACM back to MSC 4.

At t, MSC 4 cuts through the voice connection between subscriber 1 and SSP 16. SSP then asserts ringing to called party 19 over subscriber line 20.

At u, called party 19 answers the phone and SSP 16 sends an ANM to MSC 4 over signaling link 18.

At v, MSC 4 sends an ANM to SCP 7 over the inbound side of loop-around trunk 6.

At w, the voice connection between calling party 1 and called party 19 has been established and voice communication takes place. During this call, SCP 7 maintains call timers to decrement the calling subscriber's account in accordance with the billing rate of the call.

At x, calling party 1 hangs up.

At y, MSC 4 sends a REL to SCP 7 over the outbound side of loop-around trunk 6. SCP 7 then stops the call timers associated with the call and writes final account debit information to the subscriber's database 11 record.

At z through dd, REL and RLC messages are propagated between MSC 4 and SSP 16 according to standard procedures and all voice segments are released.

While a preferred embodiment of the method and system for call set-up and clearing for an intermediate access to a SCP in an ISUP network has been particularly shown and described through an exemplary transaction in a wireless prepaid enhanced services application, it is not intended to be exhaustive nor to limit the invention to the embodiment disclosed. It will be apparent to those skilled in the art that modifications can be made to the present invention without departing from the scope and spirit thereof. For example, numerous additional transactions in support of the wireless prepaid enhanced services application can be envisioned that require an intermediate connection between the subscriber and the IVRU. The inventive concepts of the present invention may also be applied to applications where an intermediate connection is desired to a SCP that plays outgoing messages only. The inventive concepts of the present invention are not limited to wireless networks and may also be applied to applications in wireline ISUP networks. It is intended that the scope of the invention be defined by the claims appended hereto and their equivalents.

What is claimed is:

1. A system for connecting to an intermediate call destination in a telecommunications network utilizing the Integrated Services Digital Network User Part protocol, said network including a switch provisioned with at least one Integrated Services Digital Network User Part loop-around trunk having an outbound side and an inbound side, said system comprising:

a service control point in said network, said service control point connected to said switch and associated with said loop-around trunk;

said service control point operated in response to receiving a call establishment message from said switch over said outbound side requesting to establish a first voice segment beginning at said outbound side of a call having a first called number, to exchange call establishment messages with said switch and to establish said first voice segment;

said service control point further operated in response to establishing said first voice segment to modify the called number of said call to a second called number, and to exchange call establishment messages with said switch over said inbound side to establish a second voice segment of said call ending at said inbound side;

said service control point further operated in response to receiving a call release message from said switch over said inbound side requesting to clear said second voice segment, to exchange call release messages with said switch and to clear said second voice segment; and said service control point further operated in response to clearing said second voice segment to restore the called number of said call to said first called number, and to exchange call establishment messages with said switch over said inbound side to establish a third voice segment of said call ending at said inbound side.

2. A system according to claim 1, wherein said call establishment messages comprise Initial Address and Address Complete messages and said call release messages comprise Release and Release Complete messages.

3. A system for connecting to an intermediate call destination in a telecommunications network utilizing the Integrated Services Digital Network User Part protocol, said network including a switch provisioned with at least one Integrated Services Digital Network User Part loop-around trunk having an outbound side and an inbound side, said system comprising:

a service control point in said network, said service control point connected to said switch and associated with said loop-around trunk;

said service control point operated in response to receiving a call establishment message from said switch over said outbound side requesting to establish a first voice segment beginning at said outbound side of a call having a first called number, to exchange call establishment messages with said switch and to establish said first voice segment;

said service control point further operated in response to establishing said first voice segment to modify the called number of said call to a second called number, and to exchange call establishment messages with said switch over said inbound side to establish a second voice segment of said call ending at said inbound side;

said service control point further operated in response to receiving a call release message from said switch over said inbound side requesting to clear said second voice segment, to exchange call release messages with said switch and to clear said second voice segment; and said service control point further operated in response to clearing said second voice segment to further process said call in accordance with information encoded into said call release messages.

4. A system according to claim 3, wherein said call establishment messages comprise Initial Address and Address Complete messages and said call release messages comprise Release and Release Complete messages.

* * * * *